C. M. OLDHAM.
QUICK CLOSING FLOAT VALVE.
APPLICATION FILED JULY 6, 1915.
1,187,773. Patented June 20, 1916.
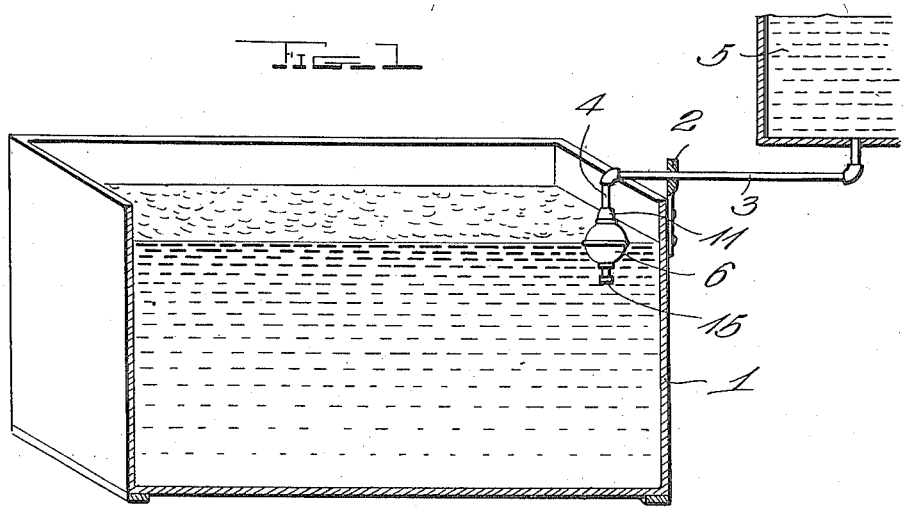
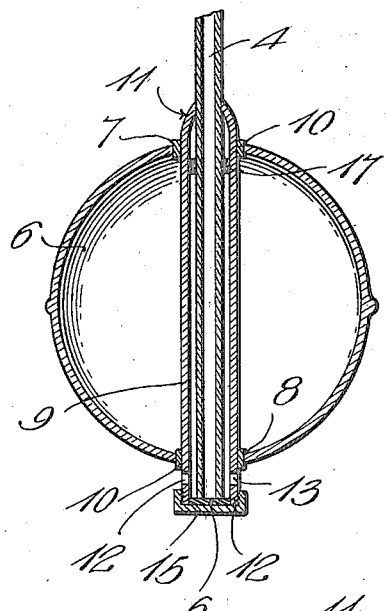
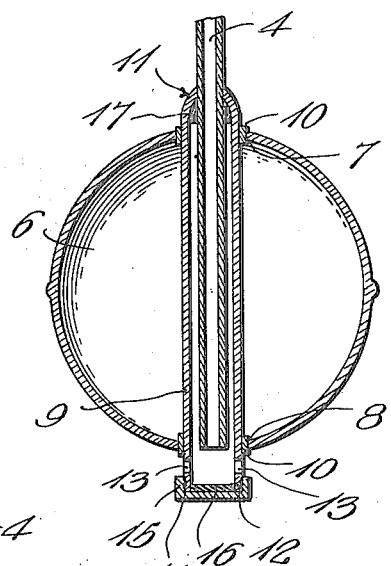
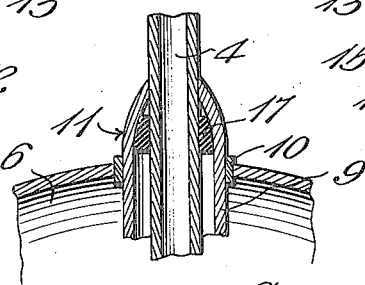
Witnesses
L. L. Townshend
Inventor
Cicero M. Oldham
By H. B. Willson & Co.
Attorneys

UNITED STATES PATENT OFFICE.

CICERO M. OLDHAM, OF NEWCASTLE, INDIANA.

QUICK-CLOSING FLOAT-VALVE.

1,187,773.  Specification of Letters Patent.  Patented June 20, 1916.

Application filed July 6, 1915. Serial No. 38,306.

*To all whom it may concern:*

Be it known that I, CICERO M. OLDHAM, a citizen of the United States, residing at Newcastle, in the county of Henry and State of Indiana, have invented certain new and useful Improvements in Quick-Closing Float-Valves; and I do declare the following to be a full, clear, and exact description of the invention, such as will enable others skilled in the art to which it appertains to make and use the same.

This invention relates to new and useful improvements in float valves and the object of this invention is to provide a float valve mechanism for regulating the supply of water or other fluid in a tank or the like, to securely hold the valve therefor open and allow the water to flow into the tank, and to automatically release the valve for instantaneous closure when the fluid in the tank reaches a predetermined point.

A further object of the invention is to provide a device of this character which is simple and durable in construction, inexpensive to manufacture, and one which will be very efficient in operation.

With these and numerous other objects in view my invention consists of novel features of construction, combination and arrangements of parts which will be hereinafter referred to and more particularly pointed out in the specification and claims.

In the accompanying drawings: Figure 1 is a central vertical longitudinal section and perspective of an animal watering tank, and a section through a portion of a tank for supplying water to said tank, the connection between the two tanks being partially broken away; Fig. 2 is a central vertical section through the float and fluid supply pipe with the valve in closed position; Fig. 3 is the same with the valve open; Fig. 4 is a detail sectional view of the wedging connection that holds the valve in open position.

In describing my invention I shall refer to the drawings in which similar reference characters designate corresponding parts throughout the several views and in which the numeral 1 designates a stock watering tank having secured on one end thereof a fixed arm 2 in which a water supply pipe 3 is mounted. This water supply pipe 3 has a downwardly extended end 4 projecting to a point below the desired water level. The overflow outlet is not needed as the water cannot rise in the tank above the desired level. The supply pipe 3 leads from a supply tank 5 preferably located on a higher level than the tank 1, although the pipe 3 may lead from any other source of supply which will bring the water to the tank 1.

A spherical float 6 having apertures 7 and 8 therein at diametrically opposite points, has secured therethrough a vertical cylindrical tube 9 as shown at 10. This tube 9 is adapted to be mounted on and slidably engaged with the downturned vertically disposed end 4 of the supply pipe. The upper end of said tube 9 is arcuately contracted as shown at 11, and its lower end 12 is open and has lateral openings 13 therein, adjacent said end and between the same and the lower end of the float 6. Fastened to the lower end of the said tube 9 by any preferred means, for instance as shown in the drawings at 14, is a cap 15 which forms a closure for the same. A gasket 16 is positioned in said cap.

On the lower end 4 of the vertically disposed supply pipe is a stop collar 17 which is positioned slightly below the arcuately contracted upper end 11 of the cylindrical tube 9 that is slidably mounted on the lower end of said supply pipe. This stop collar 17 is formed of some pliable material, for instance rubber, and is so formed that it easily adapts itself to any compression placed thereon, and when brought in contact with the arcuately contracted upper end 11 of the tube 9, will create a wedging action between the same and the pipe 4.

In the operation of this device when the valve is in open position as shown in Fig. 3 of the drawings, the float 6 will be held from dropping from the end of the supply pipe 4 by the upper end 11 of the tube 9 therethrough, being stopped by the stop collar 17 on said pipe. When in this position, the constant flow of water downwardly through the pipe 4 creates a constant downward pressure upon the stop collar 17, and on account of the same being made of some pliable material as for instance rubber, the collar will be wedged tightly between the inner face of the arcuately contracted end of said tube and the outer face of the supply pipe. This wedging action will securely and firmly hold the valve in open position during the inflow of water or other fluid into the tank and will prevent the valve from being closed until the fluid rising in the tank nearly covers the float 6, whereupon the buoyancy of the float will overcome the wedging action between the upper end of its tube and the stop collar 17 on the lower end of the supply pipe, and allow the valve to automatically and instantaneously close. This quick closing operation is obviously an advantage in float valve mechanism of this character, as immediately upon the water in the tank reaching a predetermined point, the valve will be automatically closed, thereby preventing any overflow of fluid from the tank and consequently disadvantages arising from the same.

It will be understood that the wedging action above described does not take place when the upper end of the tube 9 drops upon the rubber stop collar 17 when the valve is opened by the fluid being withdrawn from the tank, but only upon the constant inrush of water through the supply pipe striking the cap 15 at the lower end of the vertical tube 9 and flowing through the lateral openings 13 adjacent the same, which will create a constant downward pressure through the upper end of said tube on the pliable rubber stop collar 17 to create a tight and secure wedging action above specifically described.

From the foregoing description of the construction of my improved device, the manner of applying the same to use and the operation thereof, will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction, may be resorted to within the scope of the appended claims without departing from the spirit or sacrificing any of the principles of the invention.

I claim:—

1. A float valve mechanism including a vertically disposed supply pipe, a stop on said pipe, a float having a tube secured therethrough surrounding the pipe and stop and slidable thereon, a closure for the supply pipe on said tube, and said stop and tube forming a coacting wedge lock upon engagement to hold the float in open position until the rising fluid causes the buoyancy of the float to release said lock whereby the fluid supply is instantaneously cut off.

2. A float valve mechanism including a vertically disposed supply pipe, a stop on said pipe, a float having a tube secured therethrough surrounding the pipe and stop and slidable thereon, a closure for the supply pipe on said tube, said tube being arcuately contracted above the stop, and said stop and arcuately contracted portion of the tube forming a coacting wedge lock upon engagement to hold the float in open position until the rising fluid causes the buoyancy of the float to release said lock whereby the fluid supply is instantaneously cut off.

3. A float valve mechanism including a vertically disposed fixed supply pipe with its lower end open, a pliable stop collar on said pipe adjacent the lower end, a spherical float having a cylindrical tube secured therethrough surrounding the lower portion of the vertical supply pipe and the collar thereon, a closure on the lower end of said tube, said tube having openings adjacent its lower end, and the upper end of the said tube being arcuately contracted above the collar.

4. A float valve mechanism including a vertically disposed fixed supply pipe with its lower end open, a spherical float, a cylindrical tube secured therethrough having both ends projecting from the float, the upper end of said tube being arcuately contracted to slidably engage the outer wall of the supply pipe, a cap on the lower end of said tube, said tube being apertured adjacent its lower end below the float, and a pliable stop collar surrounding the supply pipe positioned within the tube adjacent its upper end.

In testimony whereof I have hereunto set my hand in presence of two subscribing witnesses.

CICERO M. OLDHAM.

Witnesses:
E. A. NATION,
GEO. A. KOONS.